United States Patent
Ichikawa et al.

(10) Patent No.: US 10,787,085 B2
(45) Date of Patent: Sep. 29, 2020

(54) VEHICLE, POWER TRANSMISSION DEVICE, AND POWER FEEDING SYSTEM

(71) Applicants: Shinji Ichikawa, Toyota (JP); Keisuke Inoue, Obu (JP)

(72) Inventors: Shinji Ichikawa, Toyota (JP); Keisuke Inoue, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 14/439,065

(22) PCT Filed: Dec. 11, 2012

(86) PCT No.: PCT/JP2012/082013
§ 371 (c)(1),
(2) Date: Apr. 28, 2015

(87) PCT Pub. No.: WO2014/091549
PCT Pub. Date: Jun. 19, 2014

(65) Prior Publication Data
US 2015/0283909 A1 Oct. 8, 2015

(51) Int. Cl.
*B60L 53/12* (2019.01)
*H02J 50/80* (2016.01)
*H02J 50/90* (2016.01)
*H02J 50/12* (2016.01)
*H02J 5/00* (2016.01)
*H02J 7/02* (2016.01)
*B60L 53/65* (2019.01)

(52) U.S. Cl.
CPC ............... *B60L 53/12* (2019.02); *B60L 53/65* (2019.02); *H02J 5/005* (2013.01); *H02J 7/025* (2013.01); *H02J 50/12* (2016.02); *H02J 50/80* (2016.02); *H02J 50/90* (2016.02)

(58) Field of Classification Search
CPC .... B60L 11/182; B60L 11/1846; B60L 53/12; H02J 5/005; H02J 7/025; H02J 17/00; H02J 50/90; H02J 50/80
USPC ....................................................... 307/10.1
See application file for complete search history.

(56) References Cited

U.S. PATENT DOCUMENTS 7,741,734 B2   6/2010  Joannopoulos et al.
8,078,349 B1 * 12/2011 Prada Gomez ...... G05D 1/0061
                                                    701/23
9,281,708 B2 *  3/2016 Wechlin ............... B60L 11/182
(Continued)

FOREIGN PATENT DOCUMENTS

AU    2006269374 B2   1/2007
AU    2006269374 C1   1/2007
(Continued)

*Primary Examiner* — Rexford N Barnie
*Assistant Examiner* — Swarna N Chowdhuri
(74) *Attorney, Agent, or Firm* — Oliff PLC

(57) ABSTRACT

A vehicle includes a power receiving unit and an RFID tag. The power receiving unit contactlessly receives electric power output from a power transmission unit. The RFID tag preliminarily stores information which is identification information for identifying the vehicle in the power transmission device and can be contactlessly read by the power transmission device. Here, the RFID tag is arranged at a vehicle body front end (a vehicle body trailing end) in a vehicle traveling direction when the vehicle is guided into a parking frame.

7 Claims, 8 Drawing Sheets

(56) References Cited

U.S. PATENT DOCUMENTS

| | | |
|---|---|---|
| 2007/0222542 A1 | 9/2007 | Joannopoulos et al. |
| 2008/0074273 A1* | 3/2008 | Endo .................. G08G 1/052 340/572.8 |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0134269 A1* | 6/2010 | Zhu .................. B60C 23/0416 340/447 |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1 | 9/2010 | Oyobe et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0181875 A1 | 7/2012 | Wechlin et al. |
| 2012/0206098 A1* | 8/2012 | Kim .................. B60L 53/39 320/108 |
| 2013/0241308 A1* | 9/2013 | Bilbrey .............. H04B 5/0037 307/104 |
| 2014/0074332 A1 | 3/2014 | Ichikawa et al. |
| 2014/0175896 A1* | 6/2014 | Suzuki .................. H03H 7/40 307/104 |

FOREIGN PATENT DOCUMENTS

| | | |
|---|---|---|
| AU | 2007349874 A1 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101490731 A | 7/2009 |
| CN | 101682216 A | 3/2010 |
| CN | 101835653 A | 9/2010 |
| CN | 101860089 A | 10/2010 |
| CN | 102474119 A | 5/2012 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2000-261369 A | 9/2000 |
| JP | 2005-210843 A | 8/2005 |
| JP | 2007-019719 A | 1/2007 |
| JP | 2008-102916 A | 5/2008 |
| JP | 2009-501510 A | 1/2009 |
| JP | 2009-106136 A | 5/2009 |
| JP | 2012-222975 A | 11/2012 |
| JP | 2014-054095 A | 3/2014 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2011/006758 A2 | 1/2011 |

\* cited by examiner

VEHICLE, POWER TRANSMISSION DEVICE, AND POWER FEEDING SYSTEM

TECHNICAL FIELD

The present invention relates to a vehicle, a power transmission device, and a power feeding system, and particularly to a pairing technique between a power transmission device and a vehicle in a power feeding system configured to supply electric power from the power transmission device to the vehicle contactlessly.

BACKGROUND ART

A contactless wireless power transmission without a power cord or a power transmission cable has been attracting attention, and its application to an electric vehicle, which receives a supply of power from a power supply outside of a vehicle (hereinafter, also referred to as "external power supply"), a hybrid vehicle, or the like has been proposed. In such a contactless power feeding system, it is necessary to suitably perform identification (pairing) between a power transmission device and a power receiving device (vehicle).

Japanese Patent Laying-Open No. 2007-19719 (PTD 1) discloses a technique that, in a system including a mobile terminal device and a portable wireless communication unit for identifying a user of the mobile terminal device for the purpose of theft prevention, the presence of a mobile terminal device subjected to authentication in a specified area is determined based on a signal from an RFID provided in the wireless communication unit (refer to PTD 1).

CITATION LIST

Patent Document

PTD 1: Japanese Patent Laying-Open No. 2007-19719

SUMMARY OF INVENTION

Technical Problem

An RFID (Radio Frequency IDentification) is a technique of performing an object recognition with use of an RFID tag, which stores ID information, and an RFID reader, which reads the information from the RFID tag through a wireless communication with the RFID tag. When such an RFID technique is applied to the pairing between a power transmission device and a vehicle in a contactless power feeding system, the following problem arises.

In other words, since a communicable distance of an RFID is generally small, a situation may occur in which, before a pairing between a power transmission device and a vehicle is established, parking to a parking frame provided with a power transmission unit of the power transmission device is completed. In such a case, since the pairing between the power transmission device and the vehicle is established after the completion of the parking, and determination on whether or not parking is made at an appropriate position can be performed after the pairing, it would be necessary to perform the parking operation again when the parking is not made at the appropriate position, thus it lacks convenience.

The present invention was achieved to solve the problem described above, and its object is to enable establishment of the pairing between the power transmission device and the vehicle at an early stage in the power feeding system for supplying electric power from the power transmission device to the vehicle contactlessly.

Solution to Problem

According to the present invention, a vehicle is a vehicle which receives electric power from a power transmission device, and the includes a power receiving unit and an ID tag. The power receiving unit contactlessly receives electric power output from the power transmission device. The ID tag preliminarily stores information which is identification information for the power transmission device to identify the vehicle and can be contactlessly read by the power transmission device. Here, the ID tag is arranged at a vehicle body front end in a vehicle traveling direction of the vehicle being guided into a parking frame in which the vehicle receives electric power from the power transmission device.

Preferably, the vehicle further includes another ID tag. The another ID tag is arranged at a vehicle body end on a side opposite to the ID tag in vehicle body forward and backward directions and preliminarily stores the identification information which can be contactlessly read by the power transmission device.

Preferably, the vehicle further includes another ID tag. This yet another ID tag is arranged close to the power receiving unit and preliminarily stores the identification information which can be contactlessly read by the power transmission device.

More preferably, the power receiving unit is provided at a vehicle body underneath part. The another ID tag is arranged close to the power receiving unit on a vehicle body end side having a larger distance among a distance from the power receiving unit to a vehicle body leading end and a distance from the power receiving unit to a vehicle body trailing end.

With such an arrangement, when the ID tag is arranged on the vehicle body end side having a larger distance among the distance from the power receiving unit to the vehicle body leading end and the distance from the power receiving unit to the vehicle body trailing end, a distance between the ID tag and the another ID tag can be reduced. Accordingly, even when the reading range of the ID tag and the another ID tag is narrow, the range of reading any one of the ID tag and the another ID tag can be increased. Therefore, the pairing between the power transmission device and the vehicle becomes less likely to be interrupted when the vehicle enters into the parking frame.

Preferably, the ID tag is arranged substantially at a center in vehicle body leftward and rightward directions.

Preferably, the vehicle further includes a communication unit which performs a wireless communication with the power transmission device. When the vehicle information indicated in the identification information read by the power transmission device corresponds to the vehicle information indicated in the information transmitted from the communication unit to the power transmission device, the vehicle is identified as a vehicle which should be supplied with electric power from the power transmission device.

More preferably, a communicable distance between the ID tag and the power transmission device is smaller than a communicable distance between the communication unit and the power transmission device.

Preferably, a difference between a natural frequency of the power receiving unit and a natural frequency of the power transmission device is less than or equal to ±10% of the natural frequency of the power receiving unit or the natural frequency of the power transmission unit.

Preferably, a coupling coefficient between the power receiving unit and a power transmission unit of the power transmission device is less than or equal to 0.3.

Preferably, the power receiving unit receives electric power from the power transmission unit through at least one of a magnetic field and an electric field. The magnetic field is formed between the power receiving unit and a power transmission unit of the power transmission device. The electric field is formed between the power receiving unit and the power transmission unit. The magnetic field and the electric field are formed between the power receiving unit and the power transmission unit and oscillate at a particular frequency.

Moreover, according to the present invention, the power transmission device is a power transmission device which supplies electric power to a vehicle and includes a power transmission unit and a reading unit. The power transmission unit contactlessly outputs electric power to the vehicle. The reading unit contactlessly reads identification information from an ID tag. The ID tag preliminarily stores the identification information and is provided in the vehicle to identify the vehicle. Here, the reading unit is arranged in a parking frame and close to a vehicle entering end of the parking frame, electric power is supplied to the vehicle in the parking frame.

Preferably, the power transmission device further includes another reading unit. This another reading unit is arranged close to the power transmission unit and contactlessly reads from the ID tag the identification information preliminarily stored in the ID tag.

Moreover, according to the present invention, the power feeding system is a power feeding system which contactlessly supplies electric power from a power transmission device to a vehicle. The vehicle includes a power receiving unit and an ID tag. The power receiving unit contactlessly receives electric power output from the power transmission device. The ID tag preliminarily stores identification information for identifying the vehicle in the power transmission device. The power transmission device includes a power transmission unit and a reading unit. The power transmission unit contactlessly outputs electric power to the power receiving unit. The reading unit contactlessly reads the identification information from the ID tag. Here, the ID tag is arranged at a vehicle body front end in a vehicle traveling direction when the vehicle is guided into a parking frame in which electric power is supplied from the power transmission device to the vehicle.

Preferably, the reading unit is arranged in the parking frame and close to a vehicle entering end of the parking frame.

Advantageous Effects of Invention

According to the present invention, an ID tag is arranged at a vehicle body front end in a vehicle traveling direction when the vehicle is guided into a parking frame in which the vehicle receives electric power from the power transmission device. Therefore, the vehicle identification information stored in the ID tag can be read by the power transmission device at an early stage. Thus, according to the present invention, the pairing between the power transmission device and the vehicle can be established at an early stage. Consequently, it allows for the alignment or the like during the parking operation.

DESCRIPTION OF EMBODIMENT

Figure 1:
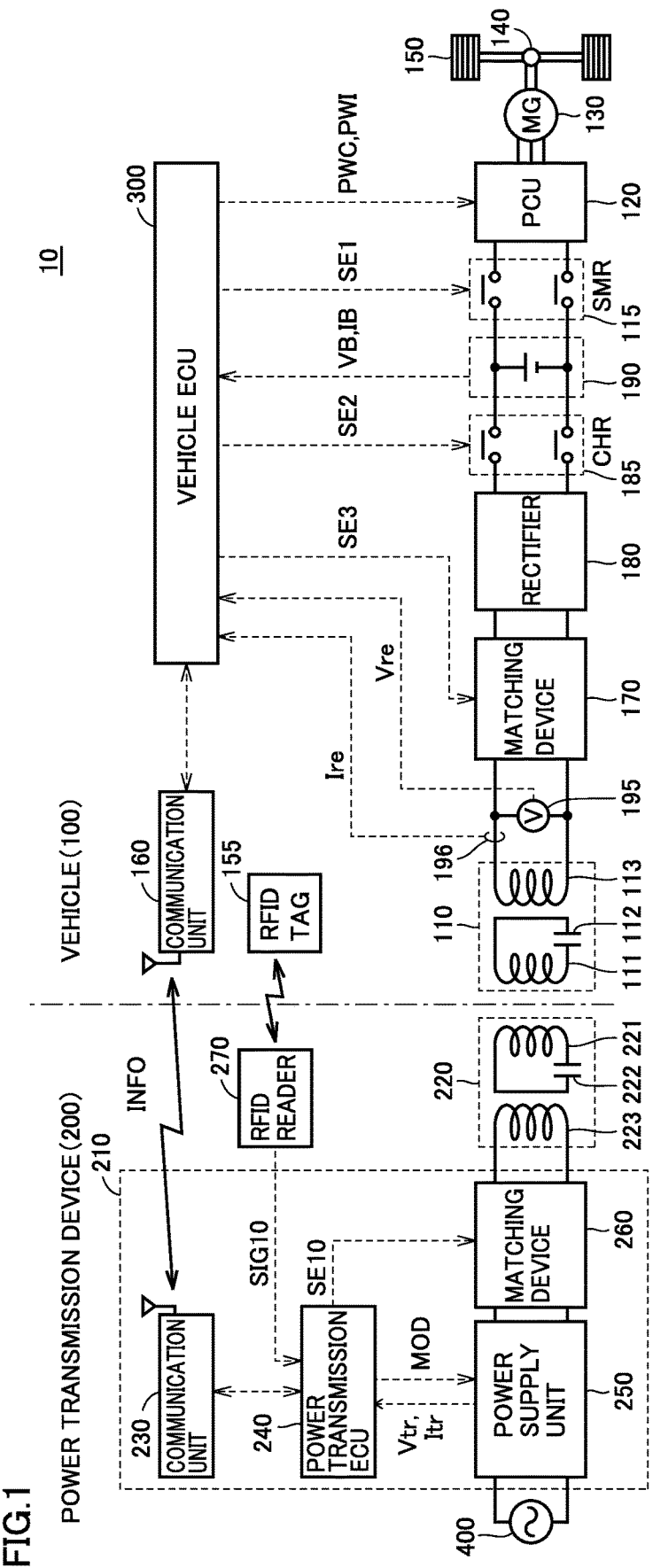
FIG. 1 represents an overall configuration of a power feeding system according to the embodiment of the present invention.

In the following, the embodiment of the present invention will be described with reference to the drawings. It should be noted that the same or corresponding parts have the same reference numerals allotted, and description thereof will not be repeated.

(Configuration of Power Feeding System)

FIG. 1 represents an entire configuration of a power feeding system 10 according to the embodiment of the present invention. Referring to FIG. 1, power feeding system 10 includes a vehicle 100 and a power transmission device 200. Power transmission device 200 includes a power supply device 210, a power transmission unit 220, and an RFID reader 270.

Power supply device 210 generates alternating current power having a predetermined frequency. As one example, power supply device 210 receives electric power from a commercial power supply 400 to generate high-frequency alternating current power, and supplies the generated alternating current power to power transmission unit 220. Power transmission unit 220 contactlessly supplies electric power to power receiving unit 110 of vehicle 100 through an electromagnetic field generated around power transmission unit 220.

Power supply device 210 includes a communication unit 230, a power transmission ECU (Electronic Control Unit) 240, a power supply unit 250, and a matching device 260. Power transmission unit 220 includes a coil 221 (hereinafter, also referred to as "resonant coil" or may be suitably referred to as "resonance coil" or the like), a capacitor 222, and a coil 223 (hereinafter, also referred to as "electromagnetic induction coil").

Power supply unit 250 is controlled by a control signal MOD from power transmission ECU 240, and converts electric power received from an alternating current power supply such as commercial power supply 400 or the like into high-frequency electric power. Power supply unit 250 supplies the converted high-frequency electric power to electromagnetic induction coil 223 through matching device 260. Moreover, power supply unit 250 outputs each detection value of a power transmission voltage Vtr and a power transmission current Itr respectively detected by a voltage sensor and a current sensor, which are not illustrated, to power transmission ECU 240.

Matching device 260 is configured to adjust an impedance of power transmission unit 220, and is typically constituted of a circuit including a reactor and a capacitor. The impedance adjustment by matching device 260 may be fixed or variable. When matching device 260 is variable, the impedance is adjusted based on a control signal SE10 from power transmission ECU 240. It should be noted that power supply unit 250 may be configured to include a function of matching device 260.

Electromagnetic induction coil 223 can be magnetically coupled to resonant coil 221 by electromagnetic induction. Electromagnetic induction coil 223 transmits the high-frequency power supplied from power supply unit 250 to resonant coil 221 by electromagnetic induction.

Resonant coil 221 contactlessly transfers the electric power transmitted from electromagnetic induction coil 223 to a resonant coil 111 included in power receiving unit 110 of vehicle 100. It should be noted that the contactless power transmission between power receiving unit 110 and power transmission unit 220 will be described later in detail.

Communication unit 230 is a communication interface configured to perform a wireless communication between power transmission device 200 and vehicle 100, and performs transmission and reception of information INFO with a communication unit 160 of vehicle 100. Communication unit 230 receives vehicle information, a signal for commanding starting and stopping of power transmission, and the like transmitted from communication unit 160 of vehicle 100, and outputs the received information, signal, and the like to power transmission ECU 240. Moreover, communication unit 230 transmits information of power transmission voltage Vtr, power transmission current Itr, and the like received from power transmission ECU 240, to vehicle 100.

RFID reader 270 is a reading unit configured to contactlessly read information of an RFID tag 155 provided at vehicle 100. RFID reader 270 includes an antenna which is not illustrated in the drawing, and uses this antenna to, for example, transmit electric power to RFID tag 155 of vehicle 100 by electromagnetic induction and receives information transmitted from RFID tag 155 in response to the transmission of power. The communication with use of the RFID has a smaller communicable distance as compared to the communication by communication unit 230. Then, RFID reader 270 outputs information SIG10 received from RFID tag 155 to power transmission ECU 240.

Power transmission ECU 240 includes a CPU (Central Processing Unit), a storage device, an input-output buffer, and the like (none of these are illustrated), performs input of a signal from each sensor or the like and output of a control signal to each equipment, and performs a control of each device in power transmission device 200. It should be noted that these controls are not limited to the processing by software but can be processed with a dedicated hardware (electronic circuit).

On the other hand, vehicle 100 includes, in addition to RFID tag 155 described above, power receiving unit 110, matching device 170, a rectifier 180, a charging relay (hereinafter, also referred to as "CHR (CHarging Relay)") 185, and a power storage device 190. Moreover, vehicle 100 further includes a system main relay (hereinafter, also referred to as "SMR (System Main Relay)") 115, a power control unit (hereinafter, also referred to as "PCU (Power Control Unit)") 120, a motor generator 130, a drive power transmission gear 140, drive wheels 150, a communication unit 160, a voltage sensor 195, a current sensor 196, and a vehicle ECU 300. Power receiving unit 110 includes a coil 111 (hereinafter, also referred to as "resonant coil" and may be suitable referred to as "resonance coil" or the like), a capacitor 112, and a coil 113 (hereinafter, also referred to as "electromagnetic induction coil").

It should be noted that, although vehicle 100 is described as an electric vehicle representatively in the present embodiment, the configuration of vehicle 100 is not limited to this as long as it is a vehicle which can travel with use of electric power stored in power storage device 190. Another examples of vehicle 100 include a hybrid vehicle having an engine, a fuel cell vehicle having a fuel cell, and the like.

Resonant coil 111 contactlessly receives electric power from resonant coil 221 of power transmission device 200. Electromagnetic induction coil 113 can be magnetically coupled to resonant coil 111 by electromagnetic induction. Electromagnetic induction coil 113 extracts by electromagnetic induction the electric power received by resonant coil 111 and outputs the electric power to rectifier 180 through matching device 170.

Matching device 170 is configured to adjust an input impedance of a load which receives the electric power received by resonant coil 111, and has for example a circuit (not illustrated) including a capacitor and a reactor as with matching device 260 of power transmission device 200.

Rectifier 180 rectifies alternating current power received from electromagnetic induction coil 113 through matching device 170, and outputs the rectified direct current power to power storage device 190. Rectifier 180 may have a static circuit configuration including for example a diode bridge and a smoothing capacitor (none of these are illustrated). As rectifier 180, so-called switching regulator can be used which performs rectification by means of a switching control. When rectifier 180 is included in power receiving unit 110, it is preferable to have a static rectifier such as a diode bridge to prevent an incorrect operation of the switching element due to an electromagnetic field.

CHR 185 is electrically connected between rectifier 180 and power storage device 190. CHR 185 is controlled by a control signal SE2 from vehicle ECU 300 and switches supplying and cutting of electric power from rectifier 180 to power storage device 190.

Power storage device 190 is a power storage element configured to be rechargeable. Power storage device 190 is configured to include, for example, a rechargeable battery such as a lithium-ion battery, a nickel hydride battery, or a lead battery, or a storage element such as an electric double layer capacitor.

Power storage device 190 stores electric power received by power receiving unit 110 and rectified by rectifier 180. Moreover, power storage device 190 is connected also to PCU 120 through SMR 115. Then, power storage device 190 supplies electric power for generating a vehicle driving force to PCU 120. Further, power storage device 190 receives electric power generated by motor generator 130 from PCU 120 and stores the electric power.

Moreover, power storage device 190 is provided with a voltage sensor and a current sensor (neither illustrated in the drawing) for detecting a voltage VB and a current IB of power storage device 190 respectively. A detection value of each of these sensors is outputted to vehicle ECU 300. Vehicle ECU 300 calculates a state of charge (also referred to as "SOC (State Of Charge)" and expressed as 0% to 100% with a fully charged state of 100%) of power storage device 190 based on each detection value of voltage VB and current IB.

SMR 115 is electrically connected between power storage device 190 and PCU 120. SMR 115 is controlled by a control signal SE1 from vehicle ECU 300 and switches supplying and cutting of electric power between power storage device 190 and PCU 120.

PCU 120 includes a converter and an inverter (neither illustrated in the drawing). The converter is controlled by a control signal PWC from vehicle ECU 300 and performs a voltage conversion between power storage device 190 and the inverter. The inverter is controlled by a control signal PWI from vehicle ECU 300 and uses the electric power having a voltage converted by the converter to drive motor generator 130.

Motor generator 130 is an alternating-current rotating electrical machine and is constituted of, for example, a permanent-magnet type synchronous motor including a rotor having a permanent magnet buried therein. Output torque of motor generator 130 is transmitted to drive wheels 150 through drive power transmission gear 140. Vehicle 100 travels with use of this torque. Motor generator 130 can generate electric power by a rotational force of drive wheels 150 during the regenerative braking of vehicle 100. Then, the voltage of the electric power generated by motor generator 130 is converted by PCU 120, and the electric power is then stored in power storage device 190.

It should be noted that, in a hybrid vehicle having an engine (not illustrated) in addition to motor generator 130, the engine and motor generator 130 are operated cooperatively to generate a required vehicle driving force. In this case, power storage device 190 can be charged by generating electric power with use of power of the engine.

Communication unit 160 is a communication interface for performing a wireless communication between vehicle 100 and power transmission device 200 and performs transmission and reception of information INFO with communication unit 230 of power transmission device 200. Information INFO outputted from communication unit 160 to power transmission device 200 includes vehicle information from vehicle ECU 300 and a signal commanding starting and stopping of power transmission.

RFID tag 155 includes an antenna and a storage unit preliminarily storing the vehicle information (neither illustrated in the drawing). When electric power is supplied from RFID reader 270 of power transmission device 200 through the antenna, RFID tag 155 transmits information stored in the storage unit through the antenna. It should be noted that, in the present embodiment, a plurality of RFID tags 155 are provided, and the RFID tags are arranged at a leading end and a trailing end of vehicle 100 as well as close to power receiving unit 220. The arrangement configuration of RFID tags 155 and RFID reader 270 of power transmission device 200 will be described later in detail.

Vehicle ECU 300 includes a CPU, a storage device, an input-output buffer, and the like (none of these are illustrated in the drawing), performs input of a signal from each sensor and output of a control signal to each device, and performs a control of each device in vehicle 100. These controls are not limited to the processing by software but can be processed with a dedicated hardware (electronic circuit).

Voltage sensor 195 detects a receiving voltage Vre of power receiving unit 110. Current sensor 196 detects a receiving current Ire of power receiving unit 110. Each detection value of receiving voltage Vre and receiving current Ire is transmitted to vehicle ECU 300 and used for calculation of a power transfer efficiency.

Figure 2:
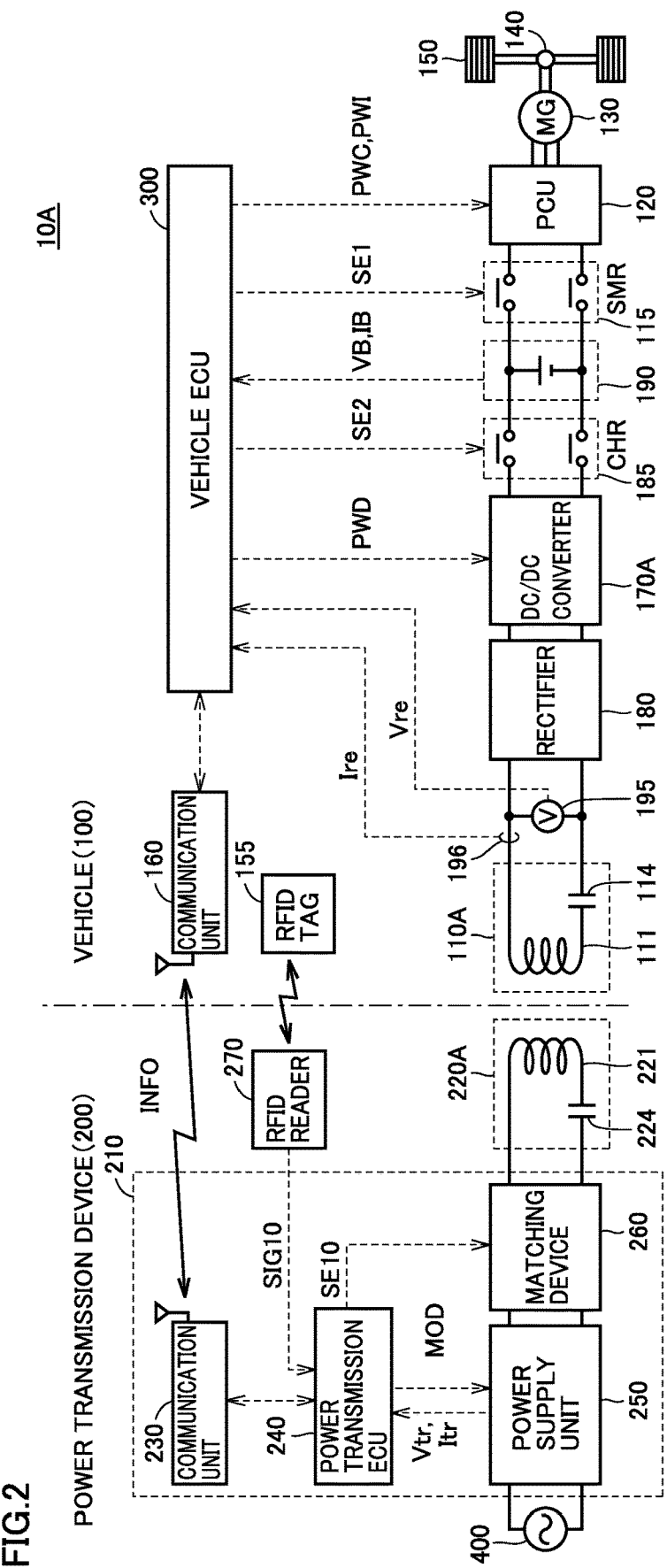
FIG. 2 represents an overall configuration of another example of the power feeding system.

It should be noted that, although FIG. 1 shows the configuration in which power receiving unit 110 and power transmission unit 220 respectively have electromagnetic induction cols 113, 223, it is also possible to employ another configuration like a power feeding system 10A shown in FIG. 2 in which a power receiving unit 110A and a power transmission unit 220A do not include electromagnetic induction coils. In this case, resonant coil 221 is connected to matching device 260 in power transmission unit 220A, and resonant coil 111 is connected to rectifier 180 in power receiving unit 110A.

It should be noted that, although capacitor 224 is connected to resonant coil 221 in series to form an LC resonant circuit with resonant coil 221 in power transmission unit 220A, capacitor 224 may be connected to resonant coil 221 in parallel. Moreover, although capacitor 114 is connected to resonant coil 111 in series to form an LC resonant circuit with resonant coil 111 also in power receiving unit 110A, capacitor 114 may be connected to resonant coil 111 in parallel.

Moreover, as shown in FIG. 2, as impedance adjustment means in the vehicle, a DC/DC converter 170A for converting the direct current voltage rectified by rectifier 180 may be provided in place of matching device 170 in FIG. 1.

(Principle of Power Transfer)

Figure 3:
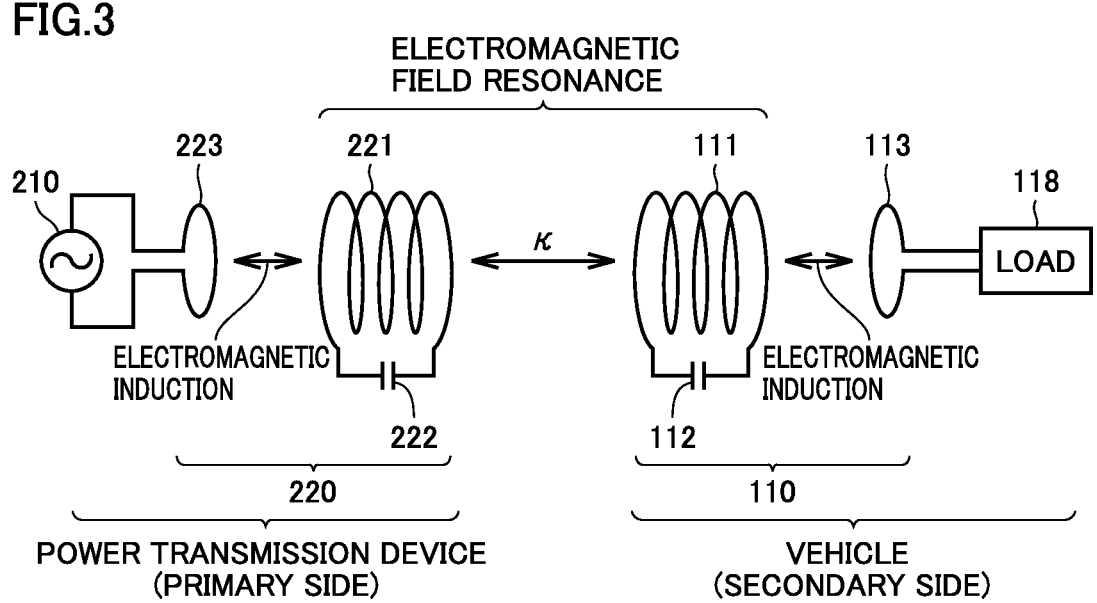
FIG. 3 represents an equivalent circuit diagram during the transfer of electric power from the power transmission device to the vehicle.

FIG. 3 is an equivalent circuit diagram representing the power transfer from power transmission device 200 to vehicle 100. Referring to FIG. 3, in power transmission device 200, electromagnetic induction coil 223 of power transmission unit 220 is provided, for example, substantially coaxially with resonant coil 221 and is spaced apart by a predetermined gap from resonant coil 221. Electromagnetic induction coil 223 magnetically couples with resonant coil 221 by electromagnetic induction, and supplies high-frequency electric power supplied from power supply device 210 to resonant coil 221 by electromagnetic induction.

Resonant coil 221 forms an LC resonant circuit with capacitor 222. It should be noted that, as will be described later, an LC resonant circuit is formed also in power receiving unit 110 of vehicle 100. A difference between the natural frequency of the LC resonant circuit formed by resonant coil 221 and capacitor 222 and the natural frequency of the LC resonant circuit of power receiving unit 110 is less than or equal to ±10% of the natural frequency of the former or the natural frequency of the latter. Resonant coil 221 receives electric power from electromagnetic induction coil 223 by electromagnetic induction and contactlessly transmits the electric power to power receiving unit 110 of vehicle 100.

It should be noted that electromagnetic induction coil 223 is provided so as to facilitate a supply of power from power supply device 210 to resonant coil 221 and that, as shown in FIG. 2, power supply device 210 may be directly connected to resonant coil 221 without providing electromagnetic induction coil 223. Moreover, since capacitor 222 is provided to adjust the natural frequency of the resonant circuit, the configuration without capacitor 222 may be employed when a desired natural frequency can be obtained with use of a stray capacity of resonant coil 221.

On the other hand, in vehicle 100, resonant coil 111 of power receiving unit 110 forms an LC resonant circuit with capacitor 112. As described above, the difference between the natural frequency of the LC resonant circuit formed by resonant coil 111 and capacitor 112 and the natural frequency of the LC resonant circuit formed by resonant coil 221 and capacitor 222 in power transmission unit 220 of power transmission device 200 is ±10% of the natural frequency of the former or the natural frequency of the latter. Then, resonant coil 111 contactlessly receives electric power from power transmission unit 220 of power transmission device 200.

Electromagnetic induction coil 113 is provided, for example, substantially coaxially with resonant coil 111 and spaced apart by a predetermined gap from resonant coil 111. Electromagnetic induction coil 113 is magnetically coupled with resonant coil 111 by electromagnetic induction, extracts by electromagnetic induction the electric power received by resonant coil 111, and outputs the electric power to an electric load 118. It should be noted that electric load 118 is electric equipment using the electric power received by power receiving unit 110. Specifically, electric load 118 collectively represents electric equipment provided subsequently to matching device 170 (FIG. 1).

It should be noted that electromagnetic induction coil 113 is provided to facilitate the extraction of the electric power from resonant coil 111, and resonant coil 111 may be directly connected to electric load 118 without providing electromagnetic induction coil 113 as shown in FIG. 2. Moreover, since capacitor 112 is provided to adjust the natural frequency of the resonant circuit, the configuration without capacitor 112 may be employed when a desired natural frequency can be obtained by using the stray capacity of resonant coil 111.

In power transmission device 200, the high-frequency alternating-current power is supplied from power supply device 210 to electromagnetic induction coil 223, and the electric power is supplied to resonant coil 221 with use of electromagnetic induction coil 223. Then, energy (electric power) is transferred from resonant coil 221 to resonant coil 111 through a magnetic field formed between resonant coil 221 and resonant coil 111 of vehicle 100. The energy (electric power) transferred to resonant coil 111 is extracted with use of electromagnetic induction coil 113 and transferred to electric load 118 of vehicle 100.

As described above, in this power transfer system, the difference between the natural frequency of power transmission unit 220 of power transmission device 200 and the natural frequency of power receiving unit 110 of vehicle 100 is less than or equal to ±10% of the natural frequency of power transmission unit 220 or the natural frequency of power receiving unit 110. Setting the natural frequencies of power transmission unit 220 and power receiving unit 110 to be within such a range can improve the power transfer efficiency. On the other hand, when the difference between the natural frequencies described above becomes greater than ±10%, the power transfer efficiency becomes less than 10%, so that there is a possibility that the negative effect such as lengthening of the power transfer time may occur.

It should be noted that the natural frequency of power transmission unit 220 (power receiving unit 110) means the oscillation frequency which is provided when the electrical circuit (resonant circuit) constituting power transmission unit 220 (power receiving unit 110) oscillates. It should be noted that, in the electrical circuit (resonant circuit) constituting power transmission unit 220 (power receiving unit 110), the natural frequency which is provided when the damping force or electric resistance is substantially zero is also referred to as a resonant frequency of power transmission unit 220 (power receiving unit 110).

Figure 4:
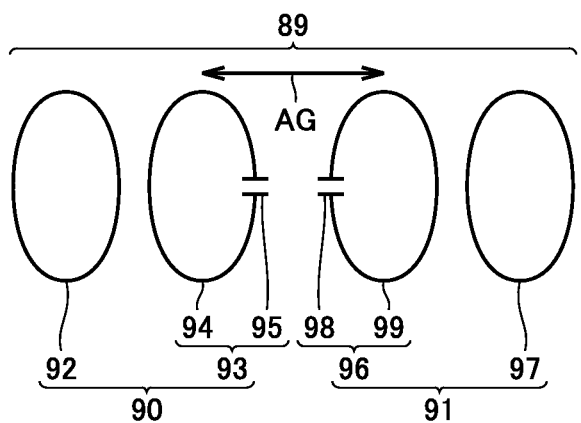
FIG. 4 represents a simulation model of the power transfer system.
Figure 5:
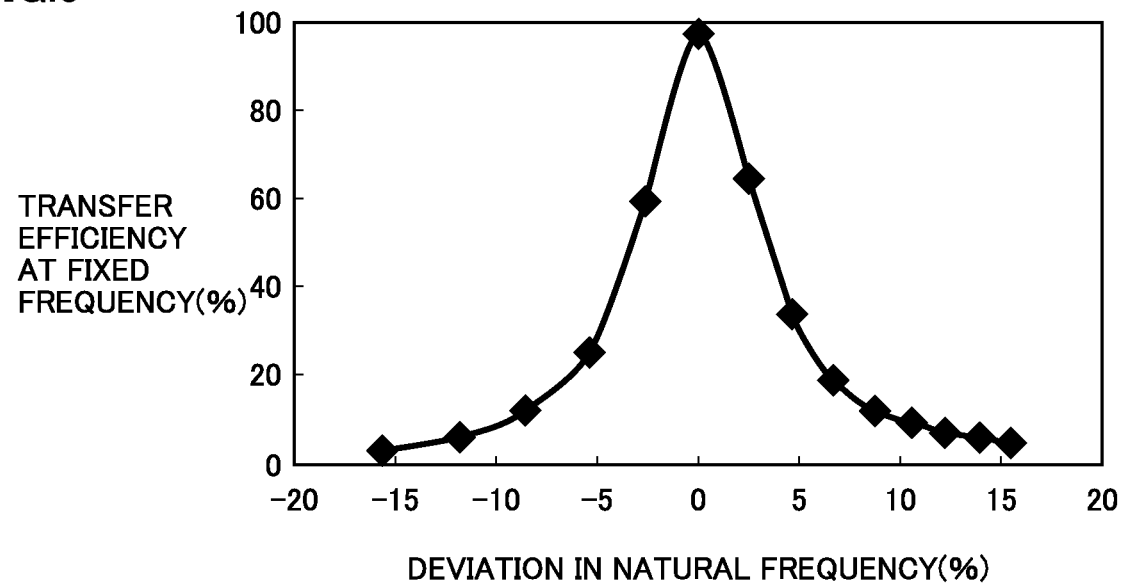
FIG. 5 represents a relationship between the deviation of natural frequencies of the power transmission unit and power receiving unit, and the power transfer efficiency.

Referring to FIGS. 4 and 5, a simulation result of analyzing the relationship between the difference in the natural frequencies and the power transfer efficiency will be described. FIG. 4 represents a simulation model of the power transfer system. Moreover, FIG. 5 represents a relationship between the deviation in the natural frequencies of the power transmission unit and power receiving unit and the power transfer efficiency.

Referring to FIG. 4, a power transfer system 89 includes a power transmission unit 90 and a power receiving unit 91. Power transmission unit 90 includes a first coil 92 and a second coil 93. Second coil 93 includes a resonant coil 94 and a capacitor 95 provided in resonant coil 94. Power receiving unit 91 includes a third coil 96 and a fourth coil 97. Third coil 96 includes a resonant coil 99 and a capacitor 98 connected to this resonant coil 99.

It is defined that an inductance of resonant coil 94 is an inductance Lt, and a capacitance of capacitor 95 is a capacitance C1. Moreover, it is defined that an inductance of resonant coil 99 is an inductance Lt, and a capacitance of capacitor 98 is a capacitance C2. With such a setting of each parameter, a natural frequency f1 of second coil 93 is expressed by the following formula (1), and a natural frequency f2 of third coil 96 is expressed by the following formula (2).

$$f1=1/\{2\pi(Lt \times C1)^{1/2}\} \quad (1)$$

$$f2=1/\{2\pi(Lr \times C2)^{1/2}\} \quad (2)$$

Here, in the case where inductance Lr and capacitance C1, C2 are fixed, and only inductance Lt is changed, the relationship between the deviation in the natural frequencies of second coil 93 and third coil 96 and the power transfer efficiency is shown in FIG. 5. It should be noted that, in this simulation, the relative positional relationship between resonant coil 94 and resonant coil 99 is fixed, and the frequency of the current supplied to second coil 93 is constant.

In the graph shown in FIG. 5, the horizontal axis denotes the deviation in the natural frequencies (%), and the vertical axis denotes the power transfer efficiency (%) in the current of the constant frequency (%). The deviation in the natural frequencies (%) is expressed by the following formula (3).

$$\text{(deviation in natural frequencies)}=\{(f1-f2)/f2\} \times 100 \text{ (\%)} \quad (3)$$

As is apparent from FIG. 5, when the deviation in the natural frequencies (%) is 0%, the power transfer efficiency is close to 100%. When the deviation in the natural frequencies (%) is ±5%, the power transfer efficiency is about 40%. When the deviation in the natural frequencies (%) is ±10%, the power transfer efficiency is about 10%. When the deviation in the natural frequencies (%) is ±15%, the power transfer efficiency is about 5%. In other words, it can be understood that the power transfer efficiency can be enhanced to a practical level by setting the natural frequencies of second coil 93 and third coil 96 so that an absolute value of the deviation in the natural frequencies (%) (the difference between the natural frequencies) falls within the range of less than or equal to 10% of the natural frequency of third coil 96. Further, it is more preferable to set the natural frequencies of second coil 93 and third coil 96 so that the absolute value of the deviation in the natural frequencies (%) becomes less than or equal to 5% of the natural frequency of third coil 96 since the power transfer efficiency can be further enhanced. It should be noted that electromagnetic field analyzing software (JMAG (registered trademark) manufactured by JSOL Corporation) is employed as simulation software.

Referring back to FIG. 3, power transmission unit 220 and power receiving unit 110 contactlessly transmit and receive electric power through at least one of a magnetic field and an electric field formed between power transmission unit 220 and power receiving unit 110. The magnetic field and/or electric field formed between power transmission unit 220 and power receiving unit 110 oscillates at a particular frequency. Then, by allowing power transmission unit 220 and power receiving unit 110 to resonate by the electromagnetic field, electric power is transferred from power transmission unit 220 to power receiving unit 110.

Here, the magnetic field having the particular frequency formed around power transmission unit 220 will be described. The "magnetic field having the particular frequency" typically has a relevance between the power transfer efficiency and the frequency of the current supplied to power transmission unit 220. Therefore, firstly, the relationship between the power transfer efficiency and the frequency of the current supplied to power transmission unit 220 will be described. The power transfer efficiency which is provided when the electric power is transferred from power transmission unit 220 to power receiving unit 110 changes due to various factors such as a distance between power transmission unit 220 and power receiving unit 110. For example, the natural frequencies (resonant frequencies) of power transmission unit 220 and power receiving unit 110 are f0, and the frequency of the current supplied to power transmission unit 220 is f3, and an air gap between power transmission unit 220 and power receiving unit 110 is an air gap AG.

Figure 6:
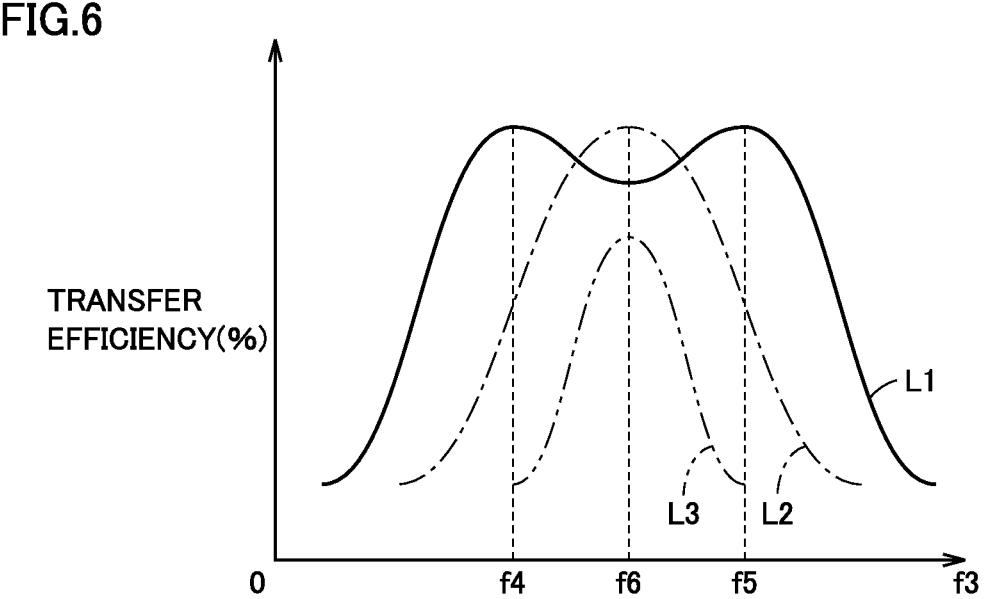
FIG. 6 is a graph representing a relationship between the power transfer efficiency and the frequency of a current supplied to the power transmission unit when an air gap is changed in the state where the natural frequency is fixed.

FIG. 6 is a graph representing a relationship between the power transfer efficiency and frequency f3 of a current supplied to power transmission unit 220 when air gap AG is changed in the state where a natural frequency f0 is fixed. Referring to FIG. 6, the horizontal axis denotes frequency f3 of the current supplied to power transmission unit 220, and the vertical axis denotes the power transfer efficiency (%). An efficiency curve L1 schematically represents a relationship between the power transfer efficiency and frequency f3 of the current supplied to power transmission unit 220 when air gap AG is small. As indicated by this efficiency curve L1, when air gap AG is small, peaks of the power transfer efficiency occur at frequencies f4, f5 (f4<f5). When air gap is set larger, the two peaks of high power transfer efficiency are changed so as to come close to each other. Then, as indicated by an efficiency curve L2, when air gap AG is set larger than a predetermined distance, one peak of the power transfer efficiency is provided, and the power transfer efficiency reaches a peak when the frequency of the current supplied to power transmission unit 220 is at frequency f6. When air gap AG is set larger than the state of efficiency curve L2, the peak of the power transfer efficiency becomes small as indicated by efficiency curve L3.

For example, the following approaches can be considered as approaches for improving the power transfer efficiency. As a first approach, it can be considered to fix the frequency of the current supplied to power transmission unit 220 in accordance with air gap AG and change the capacitance of capacitor 222 and capacitor 112 to thereby change the characteristics of the power transfer efficiency between power transmission unit 220 and power receiving unit 110. Specifically, the capacitance of capacitor 222 and capacitor 112 is adjusted so that the power transfer efficiency reaches a peak in the state where the frequency of the current supplied to power transmission unit 220 is fixed. In this approach, the frequency of the current flowing to power transmission unit 220 and power receiving unit 110 is fixed regardless of the size of air gap AG.

Moreover, as a second approach, the frequency of the current supplied to power transmission unit 220 is adjusted based on the size of air gap AG. For example, in the state where the power transfer characteristics takes efficiency curve L1, the current of frequency f4 or f5 is supplied to power transmission unit 220. When the frequency characteristic takes efficiency curves L2, L3, the current of frequency f6 is supplied to power transmission unit 220. In this case, the frequency of the current flowing to power transmission unit 220 and power receiving unit 110 is changed in accordance with the size of air gap AG.

In the first approach, the frequency of the current flowing to power transmission unit 220 has a fixed constant frequency. In the second approach, the frequency flowing to power transmission unit 220 is suitably changed in accordance with air gap AG. With the first approach and the second approach, a current having a particular frequency set so as to raise the power transfer efficiency is supplied to power transmission unit 220. With a flow of the current having a particular frequency to power transmission unit 220, a magnetic field (electromagnetic field) oscillating at a particular frequency is formed around power transmission unit 220. Power receiving unit 110 receives electric power from power transmission unit 220 through a magnetic field which is formed between power receiving unit 110 and power transmission unit 220 and oscillates at a particular frequency. Thus, the "magnetic field oscillating at a particular frequency" is not necessarily a magnetic field having a fixed frequency. It should be noted that, although the frequency of the current supplied to power transmission 220 is set by focusing on air gap AG in the example described above, the power transfer efficiency is changed due to other factors such as the deviation of power transmission unit 220 and power receiving unit 110 in the horizontal direction, thus there is a case where the frequency of the current supplied to power transmission unit 220 is adjusted based on the other factors.

It should be noted that, although the coil (for example, a helical coil) is employed in power transmission unit 220 and power receiving unit 110 in the description above, an antenna such as a meander line may be employed in place of the coil. In the case where an antenna such as a meander line is employed, a flow of the current having a particular frequency to power transmission unit 220 forms an electric field having a particular frequency around power transmission unit 220. Then, the power transfer is performed between power transmission unit 220 and power receiving unit 110 through this electric field.

In this power transfer system, the improvement in the power transmission and power reception efficiency is attempted by using a near field (evanescent field) in which a "static magnetic field" of an electromagnetic field is dominant.

Figure 7:
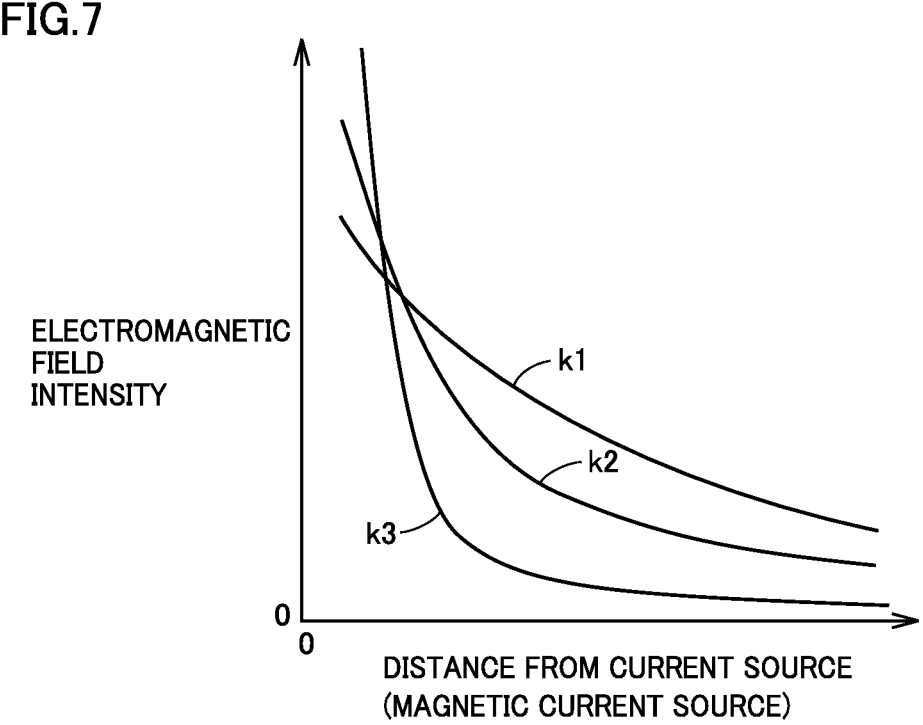
FIG. 7 represents a relationship between a distance from a current source or a magnetic current source and an intensity of an electromagnetic field.

FIG. 7 represents a relationship between a distance from a current source or magnetic current source and an intensity of the electromagnetic field. Referring to FIG. 7, the electromagnetic field is constituted of three components. A curve k1 is a component which is inversely proportional to a wave source, and it is referred to as a "radiation electromagnetic field." A curve k2 is a component which is inversely proportional to a square of the distance from the wave source, and it is referred to as an "induction electromagnetic field." Moreover, a curve k3 is a component which is inversely proportional to a cube of the distance from the wave source, and it is referred to as a "static electromagnetic field." It should be noted that, when a wavelength of the magnetic field is provided as "λ," a distance at which the intensities of the "radiation electromagnetic field," "induction electromagnetic field," and "static electromagnetic field" are substantially equal can be expressed by $\lambda/2\pi$.

The "static electromagnetic field" is a region in which the intensity of the electromagnetic wave is drastically reduced with a distance form the wave source. In the power transfer system of the present embodiment, the transfer of energy (electric power) is performed with use of a near field (evanescent field) in which this "static electromagnetic field" is dominant. In other words, in the near field in which the "static electromagnetic field" is dominant, power transmission unit 220 and power receiving unit 110 (for example, a pair of LC resonant coils) having a close natural frequency are resonated to transfer energy (electric power) from power transmission unit 220 to power receiving unit 110. Since this "static electromagnetic field" does not propagate energy to a distant place, the resonance method can transmit electric power with a less energy loss as compared to the electromagnetic wave which transfers energy (electric power) by means of "radiation electromagnetic field" propagating energy to a distant place.

As described above, in this power transfer system, power transmission unit 220 and power receiving unit 110 are resonated by means of the electromagnetic field to contactlessly transfer electric power between power transmission unit 220 and power receiving unit 110. Such an electromagnetic field formed between power transmission unit 220 and power receiving unit 110 is sometimes referred to as a near field resonant (resonance) coupling field. A coupling coefficient ($\kappa$) between power transmission unit 220 and power receiving unit 110 is, for example, about less than or equal to 0.3, preferably less than or equal to 0.1. As a matter of course, a coupling coefficient ($\kappa$) within the range of about 0.1 to 0.3 can be employed. Coupling coefficient ($\kappa$) is not limited to such values, and it may take various values providing a favorable power transfer.

It should be noted that, the coupling of power transmission unit 220 and power receiving unit 110 described above in the power transfer is referred to as, for example, "magnetic resonance coupling," "magnetic field resonance coupling," "magnetic field resonant (resonance) coupling," "near field resonant (resonance) coupling," "electromagnetic field resonant coupling," "electric field resonant coupling," or the like. The "electromagnetic field resonant coupling" means coupling including any of "magnetic resonance coupling," "magnetic field resonance coupling," and "electric field resonant coupling."

When power transmission unit 220 and power receiving unit 110 are formed in the manner described above, power transmission unit 220 and power receiving unit 110 are coupled mainly by the magnetic field, and "magnetic resonance coupling" or "magnetic field resonance coupling" is formed. It should be noted that, for example, an antenna such as a meander line can be employed for power transmission unit 220 and power receiving unit 110, and in this case power transmission unit 220 and power receiving unit 110 are coupled mainly by an electric field to form "electric field resonance coupling."

(Description of Authentication Processing between Power Transmission Device and Vehicle)

In the power feeding system described above, the power transfer is contactlessly performed. Therefore, the transmission of various information between the power transmission device and the vehicle is also generally performed by a wireless communication by the communication unit. The wireless communication with use of the communication unit is generally designed to have a relatively wide range of a communicable range to notify a plurality of vehicles that the power transmission device can be used or to allow a vehicle to search a power transmission device which can be used among a plurality of power transmission devices.

However, the wide communicable range may cause a mismatch between a vehicle identified by the power transmission device as a subject to be supplied with power and a vehicle which is about to be parked in a parking frame provided with the power transmission unit of the power transmission device and receive a supply of power. Specifically, the power transmission device may identify a vehicle which is parked in an adjacent parking frame provided with other power transmission device as a subject to the supply of power. When such a mismatch occurs, a specification of a vehicle and a state of charge of a power storage device actually receiving a supply of power from the power transmission device cannot be grasped appropriately, so that the charging operation is not performed correctly.

Or, in the case where the parking operation to the parking frame provided with the power transmission device is started, and thereafter the parking operation is stopped for some reason and the vehicle is moved from the parking frame, the wide range of the communicable range of the wireless communication with use of the communication unit causes unnecessary identification (pairing) to be continued between the power transmission device and the vehicle, and may reduce the opportunity for other vehicle to use the power transmission device.

Thus, in such a power feeding system, it would be necessary to appropriately set pairing between the power transmission device and the vehicle and a timing of setting and releasing. Therefore, in the present embodiment, as shown in FIGS. 1 and 2, a communication with use of an RFID tag 155 and an RFID reader 270 having a narrower communicable range than the communication with use of communication units 160, 230 is used together with the communication with use of communication unit 160, 230 to improve a reliability of the pairing between power transmission device 200 and vehicle 100.

On the other hand, in the communication with use of the RFID, the narrow communicable range may cause the situation where parking into the parking frame provided with power transmission unit 220 of power transmission device 200 is completed before the pairing between power transmission device 200 and vehicle 100 is established. In such a case, pairing between power transmission device 200 and vehicle 100 is established after the completion of the parking, and the determination on whether or not the parking is performed at an appropriate position can be made after the pairing is established. Therefore, it would be necessary to perform the parking operation again when the parking is not performed at an appropriate position.

Therefore, in the present embodiment, to allow the pairing between power transmission device 200 and vehicle 100 to be established at an early stage, RFID tag 155 is arranged at a vehicle body front end in the vehicle traveling direction when vehicle 100 is guided to the parking frame provided with power transmission unit 220. Specifically, in the present embodiment, RFID tag 155 is provided at each of a vehicle body leading end and a vehicle body trailing end of vehicle 100, assuming the case where vehicle 100 is parked forward in the parking frame and the case where vehicle 100 is parked backward in the parking frame.

It should be noted that the "front end" of the vehicle body does not mean only the most front end of the vehicle body, and in the vehicle body leading end it means, for example, the portion of the vehicle body on a more front side than front wheels, and in the vehicle body trailing end it means the portion on a more rear side than the rear wheels.

Moreover, in the present embodiment, RFID tag 155 is provided also near power receiving unit 110 to detect a position of power receiving unit 110 of vehicle 100 with a high accuracy. In other words, the communication with use of the RFID uses a known distance estimating approach to detect a distance between the RFID reader and the RFID tag. Thus, a distance of the RFID tag provided close to power receiving unit 110 is detected from, for example, three RFID readers to allow detection of a position of power receiving unit 110 through a principle of trilateration.

It should be noted that RFID tags 155 arranged at the vehicle body leading end, the vehicle body trailing end, and the location close to the power receiving unit are preferably arranged substantially at a center in the vehicle body leftward and rightward directions to avoid incorrect pairing with a power transmission device associated with an adjacent parking frame.

Figure 8:
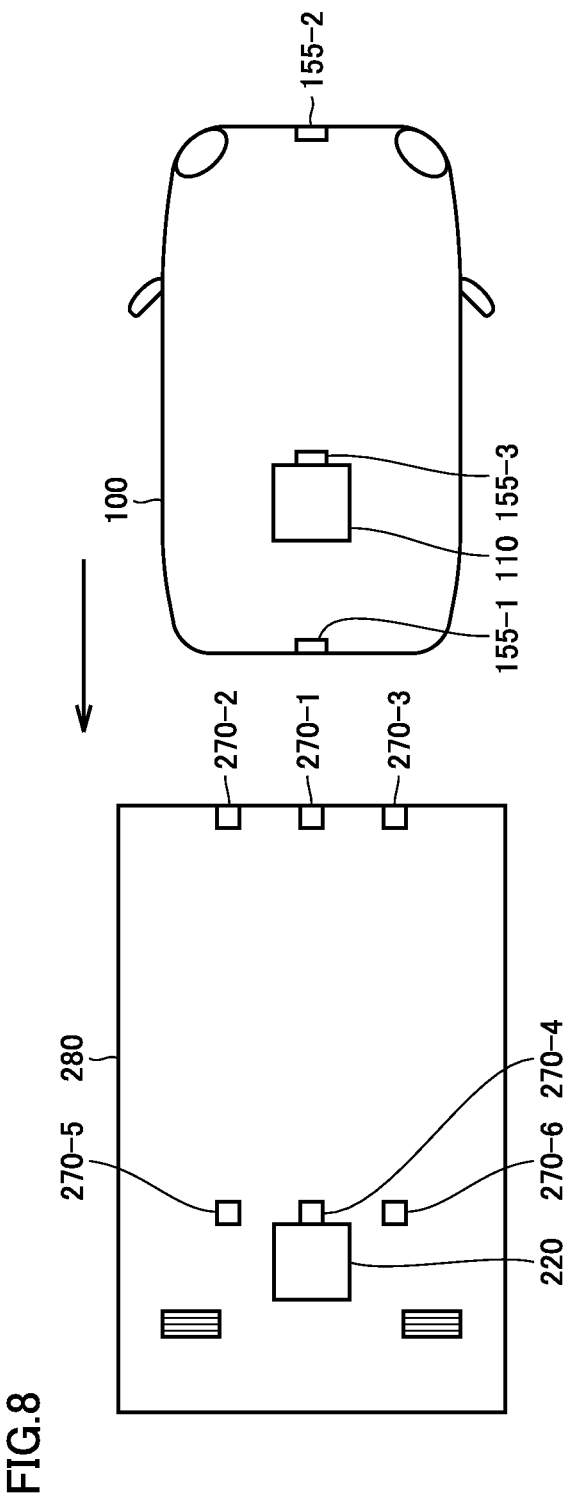
FIG. 8 represents an arrangement example of an RFID tag and an RFID reader.

FIG. 8 represents an arrangement example of RFID tags 155 and RFID readers 270. It should be noted that, in this FIG. 8, the case where vehicle 100 is parked backward to parking frame 280 will be described representatively.

Referring to FIG. 8, vehicle 100 includes power receiving unit 110 and three RFID tags 155-1 to 155-3. RFID tag 155-1 is arranged at the vehicle body trailing end. In other words, RFID tag 155-1 is arranged at a vehicle body front end in the vehicle traveling direction when vehicle 100 is guided to a parking frame 280 provided with power transmission unit 220. RFID tag 155-2 is arranged at the vehicle body leading end. If vehicle 100 is parked forward into the parking frame, RFID tag 155-2 is an RFID tag arranged at the vehicle body front end in the vehicle traveling direction.

In the present embodiment, power receiving unit 110 is arranged in a vehicle body lower part and closer to the rear part of the vehicle body. RFID tag 155-3 is arranged on a side of power receiving unit 110 closer to the vehicle body front end. In other words, RFID tag 155-3 is arranged close to power receiving unit 110 on the vehicle body front side having a longer distance among a distance from power receiving unit 110 to the vehicle body leading end and a distance from power receiving unit 110 to the vehicle body trailing end. Accordingly, the interruption of the communication of the RFID due to an excessively large gap between RFID tag 155-2 and RFID tag 155-3 is avoided.

On the other hand, power transmission device 200 includes power transmission unit 220 and RFID readers 270-1 to 270-6. Power transmission unit 220 is arranged at an appropriate location in parking frame 280 correspondingly to the arrangement of power receiving unit 110 of vehicle 100. RFID reader 270-1 is arranged on a side closer to the vehicle entering end of parking frame 280 than power transmission unit 220. In the present embodiment, RFID reader 270-1 is arranged near the vehicle entering end of parking frame 280. As described above, while RFID tag 155-1 is arranged at the vehicle body trailing end in vehicle 100 so that the pairing between power transmission device 200 and vehicle 100 during the parking operation can be completed at an early stage, RFID reader 270-1 is further arranged near the vehicle entering end of parking frames 280, thus the pairing between power transmission device 200 and vehicle 100 can be completed at an earliest stage. It should be noted that arranging RFID reader 270-1 outside of parking frame 280 is not preferable since it may raise the possibility of detection of a vehicle parked in other parking frame.

RFID readers 270-2, 270-3 are arranged relatively close to RFID reader 270-1, and these are respectively arranged on left and right sides of RFID reader 270-1. RFID readers 270-2, 270-3 are provided to calculate a vehicle height (a height of power receiving unit 110 from the ground) by means of RFID readers 270-1 to 270-3 when RFID tag 155-3 arranged at an end of power receiving unit 110 comes close. In other words, a distance of RFID tag 155-3 is detected from each of RFID readers 270-1 to 270-3, so that a position (height) of RFID tag 155-3 can be calculated with use of the principle of trilateration, and a vehicle height (a height of power receiving unit 110 from the ground) can be calculated with use of the calculation result.

It should be noted that the vehicle height affects an impedance between power transmission unit 220 and power receiving unit 110, assuming a distance between power transmission unit 220 and power receiving unit 110. Therefore, in the present embodiment, the impedance is adjusted by adjusting matching device 170 (it may be matching device 260 of power transmission device 200) in accordance with the vehicle height, so that improvement of the power transfer efficiency between power transmission unit 220 and power receiving unit 110 can be made.

RFID readers 270-4 to 270-6 are arranged close to power transmission unit 220, and provided to detect a relative positional relationship of power receiving unit 110 with respect to power transmission unit 220. As one example, RFID reader 270-4 is arranged at an end of power transmission unit 220, and RFID readers 270-5, 270-6 are arranged respectively on left and right of RFID reader 270-4 relatively close to RFID reader 270-1. As with the principle of the position detection of the RFID tag by means of RFID readers 270-1 to 270-3, RFID readers 270-4 to 270-6 detect the relative positions of power receiving unit 110 with respect to power transmission unit 220, and an alignment processing of power receiving unit 110 with respect to power transmission unit 220 is executed based on the detection result.

It should be noted that the alignment with use of the communication by the RFID cannot find out the position at which the power transfer efficiency between power transmission unit 220 and power receiving unit 110 is actually appropriate. Therefore, in the present embodiment, a test power transmission (power transmission smaller than the transmission of power for actually charging power storage device 190) from power transmission unit 220 to power receiving unit 110 is performed during the parking operation to supplement the alignment processing based on the power transfer efficiency during the test power transmission.

Figure 9:
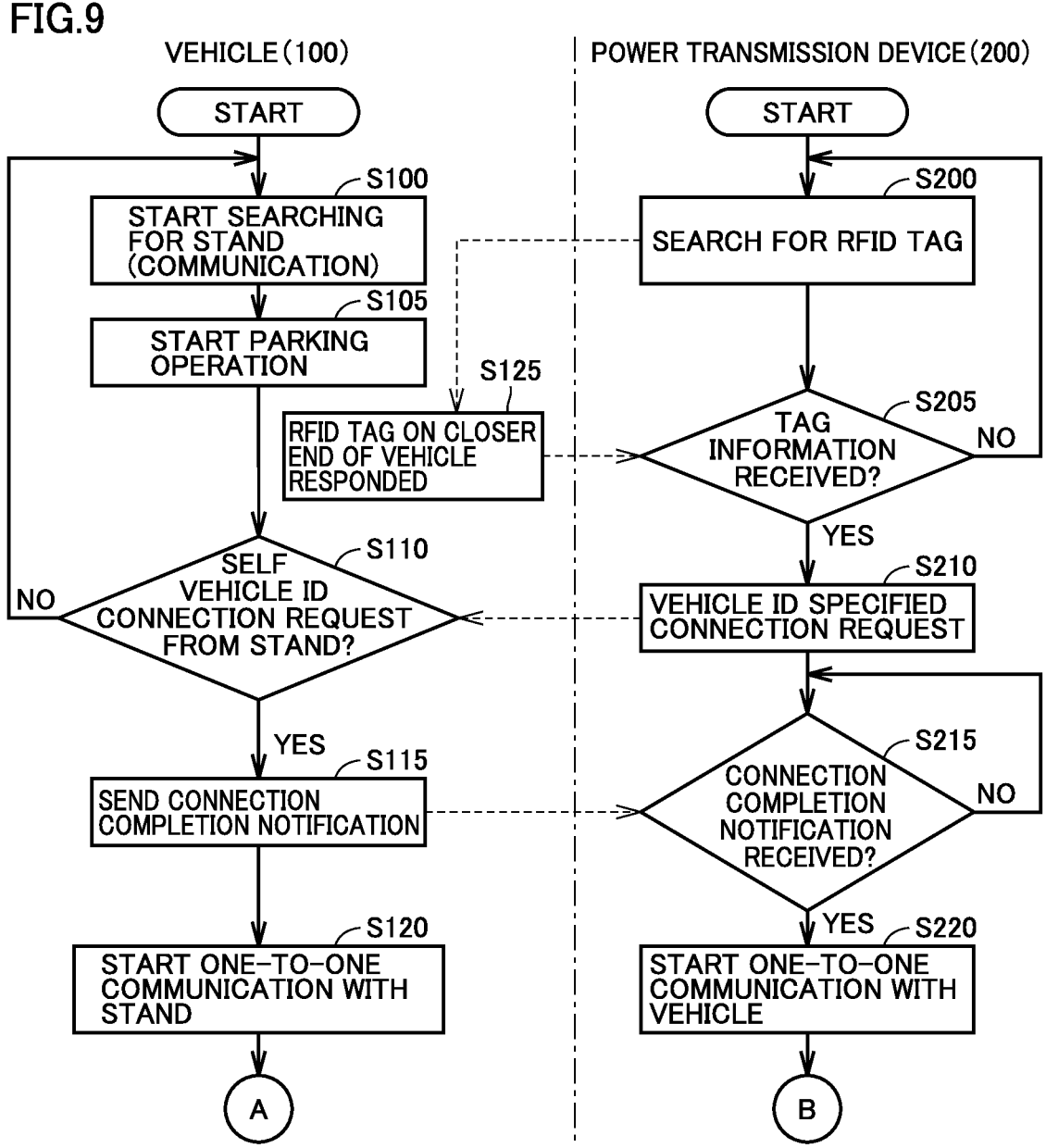
FIG. 9 is a first flowchart for explanation of an authentication processing executed in the vehicle and the power transmission device.
Figure 10:
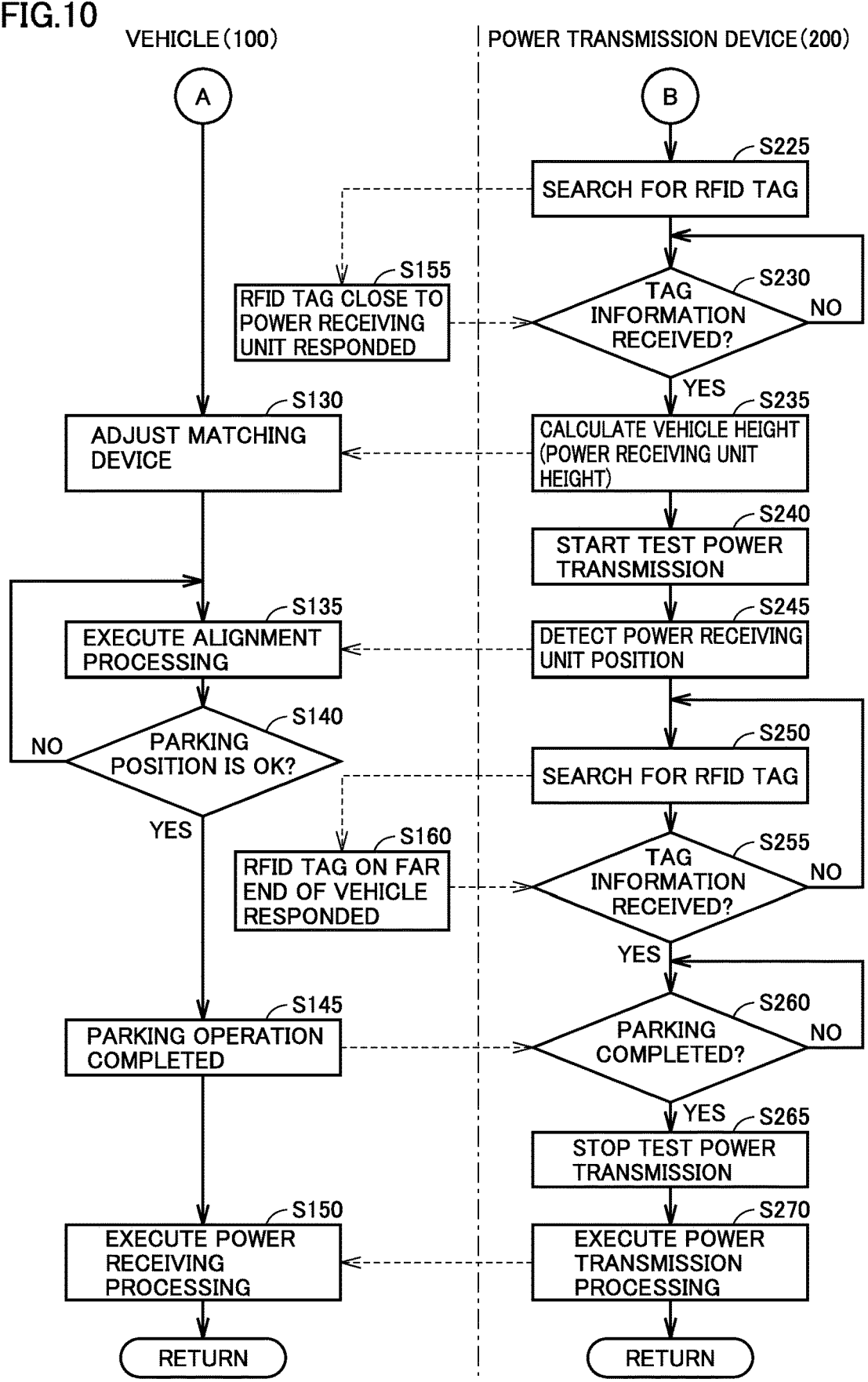
FIG. 10 is a second flowchart for explanation of the authentication processing executed in the vehicle and the power transmission device.

FIGS. 9 and 10 represent flowcharts for explanation of an authentication processing executed in vehicle 100 and power transmission device 200. Each step in the flowcharts can be achieved by calling a program preliminarily stored mainly in vehicle ECU 300 and power transmission ECU 240 from the main routine and executing the program at predetermined cycles or in response to meeting a predetermined condition. Alternatively, processing of all or some of the steps can be achieved by constructing a dedicated hardware (electronic circuit).

Referring to FIGS. 1 and 8 with FIG. 9, the processing in vehicle 100 will be described. Vehicle 100 starts searching for a power transmission device (in the following, also referred to as a "charging stand" or "stand") by a wireless communication with use of communication unit 160 (Step S100). Specifically, vehicle 100 transmits, for example, continuously at predetermined intervals, response request information including a vehicle ID for identifying the vehicle without specifying a mate stand.

Then, vehicle 100 is operated by a user to start a parking operation to a parking frame of a particular stand to perform contactless charging (Step S105). It should be noted that vehicle 100 is parked backward into parking frame 280 also herein as shown in FIG. 8. During the parking operation, RFID reader 270 of power transmission device 200 (specifically, RFID reader 270-1 arranged at the vehicle entering end of parking frame 280) reads tag information stored in RFID tag 155-1 provided at the vehicle body trailing end of vehicle 100 (Step S125). This tag information includes a vehicle ID of vehicle 100 and ID information of RFID tag 155-1.

It should be noted that, as will be described later, in power transmission device 200, when the vehicle information wirelessly transmitted from vehicle 100 and vehicle information read from RFID tag 155-1 correspond to each other and it is identified as the same vehicle, a wireless transmission (polling) of connection request information, which specifies a mate vehicle for example by adding a vehicle ID of the vehicle and a stand ID of the stand itself, is executed (Steps S205, S210).

Next, vehicle 100 determines whether or not the connection request information specifying the vehicle itself is received from the stand (Step S110). When the connection request information is not received (NO in Step S110), the process returns to Step S100, and vehicle 100 continues the parking operation while transmitting response request information to the stand.

When the connection request information is received (YES in Step S110), vehicle 100 determines that the vehicle itself is a vehicle subjected to a supply of electric power in the stand where the parking is currently performed, and transmits a connection completion notification to the stand (Step S115). Then, vehicle 100 starts a wireless communication specifying the mate stand. Accordingly, one-to-one communication between power transmission device 200 and vehicle 100 is started (Step S120).

On the other hand, when the response request information is received from vehicle 100, power transmission device 200 starts searching for RFID tag 155 by means of RFID reader 270 (specifically, RFID reader 270-1 arranged at the vehicle entering end of parking frame 280) (step S200). When RFID tag 155-1 provided at a near end of vehicle 100 (a rear end of the vehicle) receives electric power from RFID reader 270-1, RFID tag 155-1 transmits tag information stored therein (Step S125).

After searching for RFID tag 155 is started, power transmission device 200 determines whether or not tag information is received which includes a vehicle ID matching with a vehicle ID included in the response request information from vehicle 100 (Step S205). When such tag information is not received (NO in Step S205), the process returns to step S200, and power transmission device 200 continues searching for the RFID tag.

When the tag information including the vehicle ID included in the response request information is received (YES in Step S205), power transmission device 200 transmits connection request information having the stand ID of the stand itself and the received vehicle ID through a wireless communication (Step S210). When vehicle 100 receives the connection request information, a connection completion notification is transmitted from vehicle 100 through a wireless communication (Step S115). Then, when the connection completion notification is received at power transmission device 200 (YES in Step S215), power transmission device 200 starts a wireless communication specifying the vehicle. Accordingly, one-to-one communication between vehicle 100 and power transmission device 200 is established (Step S220).

Referring to FIG. 10, the description as to power transmission device 200 will be continued. Even after RFID tag 155-1 provided at the near end of vehicle 100 (the rear end of the vehicle) is detected, and the one-to-one communication with vehicle 100 is started, power transmission device 200 continuously executes the searching for RFID tag 155 (Step S225). Then, as the parking operation proceeds, and when RFID tag 155-3 provided close to power receiving unit 110 receives electric power from RFID reader 270-1 subsequently to RFID tag 155-1, RFID tag 155-3 transmits tag information stored therein (Step S155). It should be noted that the tag information includes, in addition to vehicle ID of vehicle 100, the ID information for specifying RFID tag 155-3.

When the tag information of RFID tag 155-3 is received (YES in Step S230), power transmission device 200 calculates a vehicle height of vehicle 100 (a height of power receiving unit 110 from the ground) (Step S235). In the present embodiment, as shown in FIG. 8, RFID readers 270-2, 270-3 are provided at positions relatively close to RFID reader 270-1, and a distance of RFID tag 155-3 from each of RFID readers 270-1 to 270-3 is detected, so that a position of RFID tag 155-3 (a height from the ground) is calculated with use of the principle of trilateration. Then, a vehicle height (a height of power receiving unit 110 from the ground) is calculated with use of the calculation result. The calculation result of the vehicle height is transmitted to vehicle 100, and matching device 170 is adjusted in vehicle 100 in accordance with the vehicle height. It should be noted that, although it is not illustrated in the drawing, matching device 260 of power transmission device 200 may be adjusted in accordance with the vehicle height.

Next, power transmission device 200 starts test power transmission for supporting the alignment process of power receiving unit 110 with respect to power transmission unit 220 (Step S240). Next, power transmission device 200 detects a relative position of power receiving unit 110 with respect to power transmission unit 220 (Step S245). In the present embodiment, as shown in FIG. 8, RFID reader 270-4 is provided close to power transmission unit 220, and RFID readers 270-5, 270-6 are further provided at positions relatively close to RFID reader 270-4. Then, a distance from each of RFID readers 270-4 to 270-6 to RFID tag 155-3 provided close to power receiving unit 110 is detected, so that the position of RFID tag 155-3 is calculated with use of the principle of trilateration, and the relative position of power receiving unit 110 with respect to power transmission unit 220 is detected based on the calculation result.

The result of detecting the position of power receiving unit 110 is transmitted to vehicle 100, and the alignment processing of power receiving unit 110 with respect to power transmission unit 220 is executed based on the result of detection of the position (Step S135). It should be noted that, since the position detection with use of the communication by means of the RFID cannot find out the position at which the power transfer efficiency between power transmission unit 220 and power receiving unit 110 actually becomes optimum as described above, the alignment processing between power transmission unit 220 and power receiving unit 110 is supplemented based on the power transfer efficiency involved in the test power transmission started in step S240.

Power transmission device 200 continuously executes searching for RFID tag 155 (Step S250). Then, as the parking operation proceeds, and when RFID tag 155-2 arranged at a far end of vehicle 100 (the vehicle leading end) receives electric power from RFID reader 270-1 subsequently to RFID tag 155-3, RFID tag 155-2 transmits tag information stored therein (Step S160). It should be noted that this tag information also includes, in addition to the vehicle ID of vehicle 100, the ID information for specifying RFID tag 155-2.

Then, when the tag information of RFID tag 155-2 is received (YES in Step S255), and further the parking of vehicle 100 is completed (YES in step S260), power transmission device 200 stops the test power transmission (Step S265) and executes the power transmission processing for charging power storage device 190 of vehicle 100 (Step S270).

On the other hand, in vehicle 100, matching device 170 is adjusted based on the calculation result of the vehicle height (Step S130). It should be noted that the adjustment of matching device 170 can be made by, for example, preliminarily obtaining a relationship between a vehicle height and an adjusted value, preparing a map or the like, and adjusting matching device 170 based on the calculation result of the vehicle height with use of the map.

Moreover, vehicle 100 executes the alignment processing of power receiving unit 110 with respect to power transmission unit 220 based on the detection result of the position of power receiving unit 110 (Step S135). It should be noted that, in vehicle 100, the test power transmission is received from power transmission device 200, and the alignment processing is supplemented based on the power transmission efficiency in the test power transmission (it may be simply the received power).

Next, vehicle 100 determines whether or not the parking position of vehicle 100 in parking frame 280 is appropriate (Step S140). For example, when the deviation amount in the relative position between power transmission unit 220 and power receiving unit 110 is within a predetermined range, and the power transfer efficiency by the test power transmission exceeds a predetermined value, it is determined that the parking position is appropriate.

When the parking position is not appropriate (NO in Step S140), the process returns to Step S135, and the alignment processing is executed continuously. On the other hand, when the parking position is appropriate (YES in Step S140), vehicle 100 transmits a completion notification of the parking operation to power transmission device 200 (Step S145). After that, the process proceeds to Step S150, and the power receiving processing is executed in vehicle 100 with the execution of the power transmission processing in power transmission device 200 (Step S150).

As described above, in the present embodiment, since RFID tag 155 (RFID tag 155-1) is arranged at the vehicle body front end (the vehicle body trailing end) in vehicle 100 in the vehicle traveling direction when the vehicle is guided to parking frame 280, the vehicle ID stored in RFID tag 155 can be read by power transmission device 200 at an early stage. Thus, according to the present embodiment, the pairing between power transmission device 200 and vehicle 100 can be established at an early stage. Consequently, it allows for the alignment during the parking operation.

Moreover, in the present embodiment, since RFID tag 155 (RFID tag 155-2) is provided also at the vehicle body leading end, the pairing between power transmission device 200 and vehicle 100 can be established at an early stage also during the forward parking.

Further, in the present embodiment, since RFID tag 155 (RFID tag 155-3) is further provided close to power receiving unit 110, a height of power receiving unit 110 from the ground and the relative position between power transmission unit 220 and power receiving unit 110 can be detected with a high accuracy by detecting a distance from the RFID reader to RFID tag 155-3.

Further, RFID tag 155-3 is provided close to power receiving unit 110 on the vehicle body end side having a larger distance (in the present embodiment, it is the vehicle front side) among a distance from power receiving unit 110 to the vehicle body leading end and a distance from power receiving unit 110 to the vehicle body trailing end. Accordingly, the interruption of communication of the RFID due to excessively large gap between RFID tag 155-3 and RFID tag 155-2 during the parking operation can be avoided.

Moreover, in the present embodiment, each of RFID tags 155-1 to 155-3 is arranged substantially at a center in the vehicle body leftward and rightward directions, incorrect pairing with the power transmission device corresponding to the adjacent parking frame can be avoided.

Further, according to the present embodiment, a wide area communication with use of the communication unit and the narrow area communication with use of the RFID are used together to perform the pairing between power transmission device 200 and vehicle 100, so that a highly reliable pairing can be achieved.

Moreover, in the present embodiment, RFID reader 270-1 is arranged near the vehicle entering end of parking frame 280 in parking frame 280 also in power transmission device 200. Accordingly, the pairing between power transmission device 200 and vehicle 100 can be completed at an earliest stage.

It should be noted that, in the present embodiment, RFID tag 155-1 corresponds to one example of the "ID tag" in the present invention, and each of RFID tags 155-2, 155-3 corresponds to one example of "another ID tag" in the present invention. Moreover, RFID reader 270-1 corresponds to one example of the "reading unit" in the present invention, and RFID reader 270-4 corresponds to one example of "another reading unit" in the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGN LIST 10, 10A power feeding system; 100, 100A vehicle; 110, 110A power receiving unit; 111, 113, 221, 223 coil; 112, 114, 222, 224 capacitor; 115 SMR; 118 electric load; 120 PCU; 130 motor generator; 140 power transmission gear; 150 drive wheel; 155 RFID tag; 160, 230 communication unit; 170, 260 matching device; 180 rectifier; 185 CHR; 190 power storage device; 195 voltage sensor; 196 current sensor; 200 power transmission device; 210 power supply device; 220, 220A power transmission unit; 240 power transmission ECU; 250 power supply unit; 270 RFID reader; 280 parking frame; 300 vehicle ECU; 400 commercial power supply.

The invention claimed is:

1. A vehicle which receives electric power from a power transmission device, the vehicle comprising:

a power receiving unit which contactlessly receives electric power output from said power transmission device, first, second and third ID tags, each of which preliminarily stores information which is identification information for said power transmission device to identify said vehicle and is contactlessly read by said power transmission device, said first ID tag being arranged at a vehicle body leading end, said second ID tag being arranged at a vehicle body trailing end, said power receiving unit being provided at a vehicle body underneath part, said power receiving unit having a first side closest to said vehicle body leading end and a second side closest to said vehicle body trailing end, wherein a distance from said first side to the vehicle body leading end is a first distance and a distance from said second side to the vehicle body trailing end is a second distance, said third ID tag being directly coupled to said power receiving unit on the first side when the first distance is greater than the second distance, and said third ID tag being directly coupled to said power receiving unit on the second side when the second distance is greater than the first distance.

2. The vehicle according to claim 1, wherein each of said first, second and third ID tags is arranged at a center in vehicle body leftward and rightward directions.

3. The vehicle according to claim 1, further comprising:

a communication unit performing a wireless communication with said power transmission device, when vehicle information indicated in said identification information read by said power transmission device corresponds to vehicle information indicated in information transmitted from said communication unit to said power transmission device, said vehicle is identified as a vehicle to be supplied with electric power from said power transmission device.

4. The vehicle according to claim 3, wherein a communicable distance between said ID tag and said power transmission device is smaller than a communicable distance between said communication unit and said power transmission device.

5. The vehicle according to claim 1, wherein a coupling coefficient between said power receiving unit and a power transmission unit of said power transmission device is less than or equal to 0.3.

6. The vehicle according to claim 1, wherein said power receiving unit receives electric power from said power transmission unit through at least one of a magnetic field and an electric field, said magnetic field being formed between said power receiving unit and a power transmission unit of said power transmission device, said electric field being formed between said power receiving unit and said power transmission unit, and said magnetic field and said electric field are formed between said power receiving unit and said power transmission unit and oscillate at a particular frequency.

7. The vehicle according to claim 1, wherein said power receiving unit is a single power receiving unit that contactlessly receives all electrical power output from the power transmission device.

\* \* \* \* \*